United States Patent [19]

Wesley

[11] Patent Number: 4,601,771

[45] Date of Patent: Jul. 22, 1986

[54] LABELING MACHINE ATTACHMENT FOR APPLYING PRESSURE SENSITIVE LABELS TO ROUND CONTAINERS

[75] Inventor: James G. Wesley, Cicero, Ill.

[73] Assignee: Labelette Company, Forest Park, Ill.

[21] Appl. No.: 686,589

[22] Filed: Dec. 26, 1984

[51] Int. Cl.[4] .......... B32B 1/00

[52] U.S. Cl. .......... 156/215; 156/361; 156/447; 156/457; 156/487

[58] Field of Search .......... 156/446–449, 156/455–458, 361, 542, 487, 215, 212, 213

[56] References Cited

U.S. PATENT DOCUMENTS

| | | | |
|---|---|---|---|
| 3,278,359 | 10/1966 | Wesley | 156/351 |
| 3,446,690 | 5/1969 | Charles | 156/446 |
| 4,162,182 | 7/1979 | Wesley | 156/487 |
| 4,183,779 | 1/1980 | Barber et al. | 156/361 |
| 4,222,810 | 9/1980 | Ytterstrom | 156/487 |

*Primary Examiner*—David Simmons

*Attorney, Agent, or Firm*—Mann, McWilliams, Zummer and Sweeney

[57] ABSTRACT

A labeling device or mechanism in the nature of an attachment for application to labeling machines of the type disclosed in Wesley U.S. Pat. No. 3,278,359 for adapting the basic semi-automatic labeling machine disclosed in said patent for semi-automatic pressure sensitive labeling of round containers whereby the individual pressure sensitive labels are removed from a release agent coated ribbon bearing same and are individually applied to round containers applied to the basic labeling machine for that purpose, which attachment comprises a slotted frame that seats on the upper end of the basic labeling machine glue label supply hopper floor plate and has swingably mounted on same cantilever fashion an elongate feed table on which a label carrying ribbon supply spool and a ribbon take up spool are removably mounted, with the feed table having at its projecting end a flat angle label adhesion breaker wedge type edging, and a cooperating label wiping brush, that in operation are disposed adjacent the container to be labeled when the latter is disposed on the basic labeling machine support rollers for that purpose, with the ribbon bearing the labels being trained in a training way that extends over the top of the feed table, about its flat angled breaker wedge type edging and its projecting end, and then reversely under the feed table to the movement inducing mechanism therefor, the arrangement being such that when a container is rotated by the basic labeling machine support rollers, the ribbon is advanced in a forward movement along its training way to break the label to be applied to the container free of its carrier ribbon at the wedge type edging, with the leading end of the label as it separates from the ribbon being directed toward and engaging the rotating container by the brush which wipingly guides the label onto the container.

10 Claims, 9 Drawing Figures

LABELING MACHINE ATTACHMENT FOR APPLYING PRESSURE SENSITIVE LABELS TO ROUND CONTAINERS

The present invention relates to semi-automatic labeling machines, and more particularly, to a labeling device or mechanism arranged for application as an attachment to the basic semi-automatic glue labeling machine of Wesley Pat. No. 3,278,359, granted Oct. 11, 1966, to adopt labeling machines of that type to apply to round containers pressure sensitive labels, as distinguished from the glue type labeling disclosed in said patent.

The labeling machine of the above identified patent provides an arrangement for conveniently applying discrete labels to round containers employing glue labeling procedures in which the containers are one by one laid sidewise on a pair of rotating support rollers forming the support cradle or crib for the container being labeled, and the label for the container that is being processed is separated therefrom a supply of such labels in the machine label hopper, brought past a glue station where glue is applied thereto, and guided into cooperation with the container in timed sequence to the rotation of the container, so that the label becomes affixed to the round side wall of the container in the manner desired in accordance with the invention of that patent. As disclosed in said patent, the glue labeling procedures and apparatus there contemplate that the labels to be processed are placed, adhesive free, in a stack in the label supply hopper that includes a downwardly sloping floor plate. The labels are fed one at a time from the hopper to a register station, and when a container to be labeled is applied to the labeling machine support rollers, the label is passed through the glue station and is guided into cooperation with the container, in the manner already indicated. The nature of pressure sensitive labels, the adhesive backing of which is an integral part of the label as it is obtained from the makers of such products, does not admit of employing glue labeling procedures of the type disclosed in said patent for applying pressure sensitive labels to containers.

The so-called pressure sensitive labels generally comprise labels which have a pressure sensitive adhesive backing, and such labels are ordinarily supplied in bulk form by being adhered to a release agent coated side of a carrier sheet or ribbon.

The application of pressure sensitive labels to containers in any sort of a mechanized mass production manner is complicated by the fact that the individual labels involved must be somehow separated and then thereafter individually handled or manipulated to apply same to the container, while avoiding any contact with the label adhesive coating that would either adversely affect the label adhesive, or cause the label to adhere to anything other than the container, or both. It is well known that pressure sensitive labels as applied to their carrier sheets or ribbons, while readily separating from the carrier by peeling the label therefrom once the edge or corner of the label has been separated from the backing, often make such separation irratic and piecemeal due to the initial difficulty of reliably breaking a specific edge or corner portion of the label from the carrier without damaging the label or tearing or breaking the carrier. Further, once the label is freed from its carrier, its adhesive backing by its nature will tend to adhere to anything it contacts, and this together with the sheet type nature of its physical shape, make individual handling and manipulation of the label difficult at best.

A principal object of the present invention is to provide a pressure sensitive label processing and manipulating mechanism or device in the form of an attachment for glue labeling machines of the type disclosed in said patent to adapt them for applying pressure sensitive labels to round containers semi-automatically, by way of a separate pressure sensitive label handling mechanism forming a part of said attachment that is effective to provide trouble free removal of the individual labels from the carrier on which they are supplied, and applying the individual labels to round containers that are disposed on the support rollers of the basic glue labeling machine afore-referred to for that purpose.

Another principal object of the present invention is to provide a label handling attachment of the type indicated that permits rapid semi-automatic pressure sensitive labeling of round containers at a speed of twenty units per minute or more, that permits the basic glue labeling machine that has been referred to to function as described in said patent without removal of the pressure sensitive labeling attachment, and that permits simultaneous operation of the basic glue labeling machine and the pressure sensitive labeling attachment to apply both types of labels to the same container being processed.

Other important objects of the invention are to provide a pressure sensitive label handling mechanism in the form of an attachment for the basic glue labeling machine of said patent that is easy to install, that is compatible with the arrangement and operation of said basic glue labeling machine, that is effective and reliable in operation, and that need not be removed when the basic labeling machine is to be operated as a glue labeler.

In accordance with the invention a pressure sensitive label processing or handling mechanism or device is provided in the form of an attachment for application to glue labeling machines of the type indicated to adapt glue labeling machines of this type for removal of the pressure sensitive adhesive backed labels one by one from a release agent coated side of a carrier ribbon, which such labels are supplied, and then apply the individual labels as they are so removed from the carrier ribbon to a round container disposed for this purpose on the support rollers of the basic glue labeling machine involved. The attachment mechanism involved comprises a slotted frame that seats on the upper end of the labeling machine label supply hopper floor plate and has swingably mounted on same cantilever fashion an elongate feed table on which a pressure sensitive label bearing carrier ribbon supply spool and a ribbon take up spool are removably and rotatably mounted with the feed table having as its projecting end a flat angle pressure sensitive label adhesion breaker edging, and a cooperating label wiping brush that in operation are disposed adjacent the container to be labeled when the latter is disposed on the basic glue labeling machine support rollers for this purpose, with the ribbon bearing the pressure sensitive labels being trained in a training way over the top of the feed table, about the feed table flat angle breaker edging, and then reversely under the feed table for providing a sharp angled reversing movement camming action on the ribbon, and with the ribbon being trained between the wiping brush and the edging. The arrangement is such that when a container to be labeled with a pressure sensitive label is disposed on and rotated by the basic glue labeling machine support rollers, the ribbon bearing the pressure sensitive labels is advanced in a forward movement to break the label to be applied to the container from the ribbon at the feed table breaker edging with the thus free label leading end being directed toward the side wall of the rotating container by the brush wiper, and the brush wipingly guiding the label onto the container.

The feed table of the attachment is adjustable lengthwise thereof and elevationally with regard to the location of the container to be labeled so that the feed table may be set in optimum operating position relative to a particular container size to be labeled. The feed table is spring biased to swing upwardly away from the feed rollers to an out of the way and inoperative position at substantially right angles to the hopper floor plate, in which position the basic glue labeling machine may be operated as such.

Other objects, uses, and advantages will be obvious or become apparent from a consideration of the following detailed description and the application drawings in which like reference numerals indicate like parts throughout the several views.

Figures 2, 9:
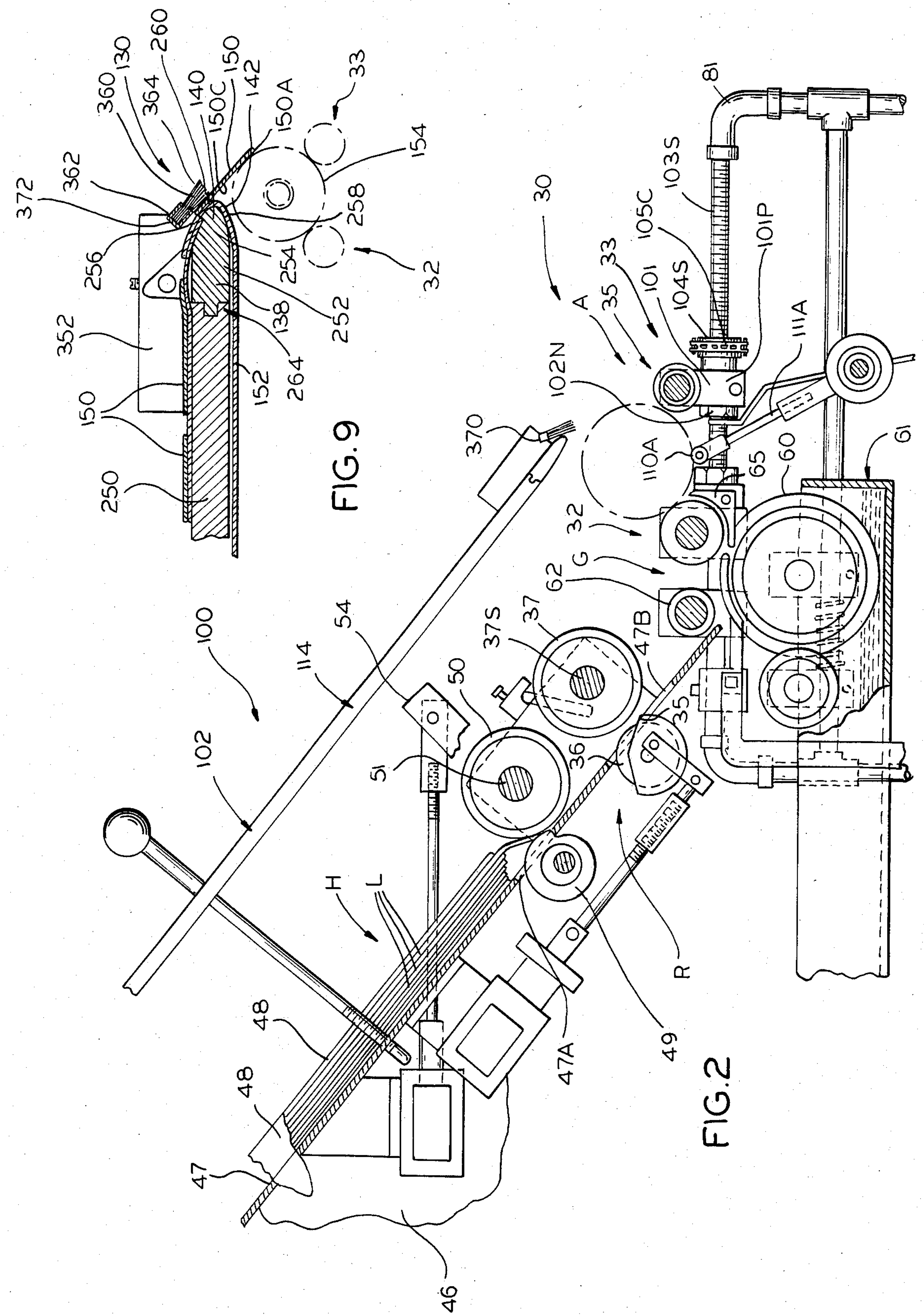
FIG. 2 is a vertical sectional view taken from front to rear through the labeling machine of FIG. 1 illustrating several of the principal components of the basic glue labeling machine, and the projecting lower end of the attachment feed table as it is to be operably associated with a container to be labeled as applied to the support rollers of the basic glue labeling machine in question.
Figures 3, 4:
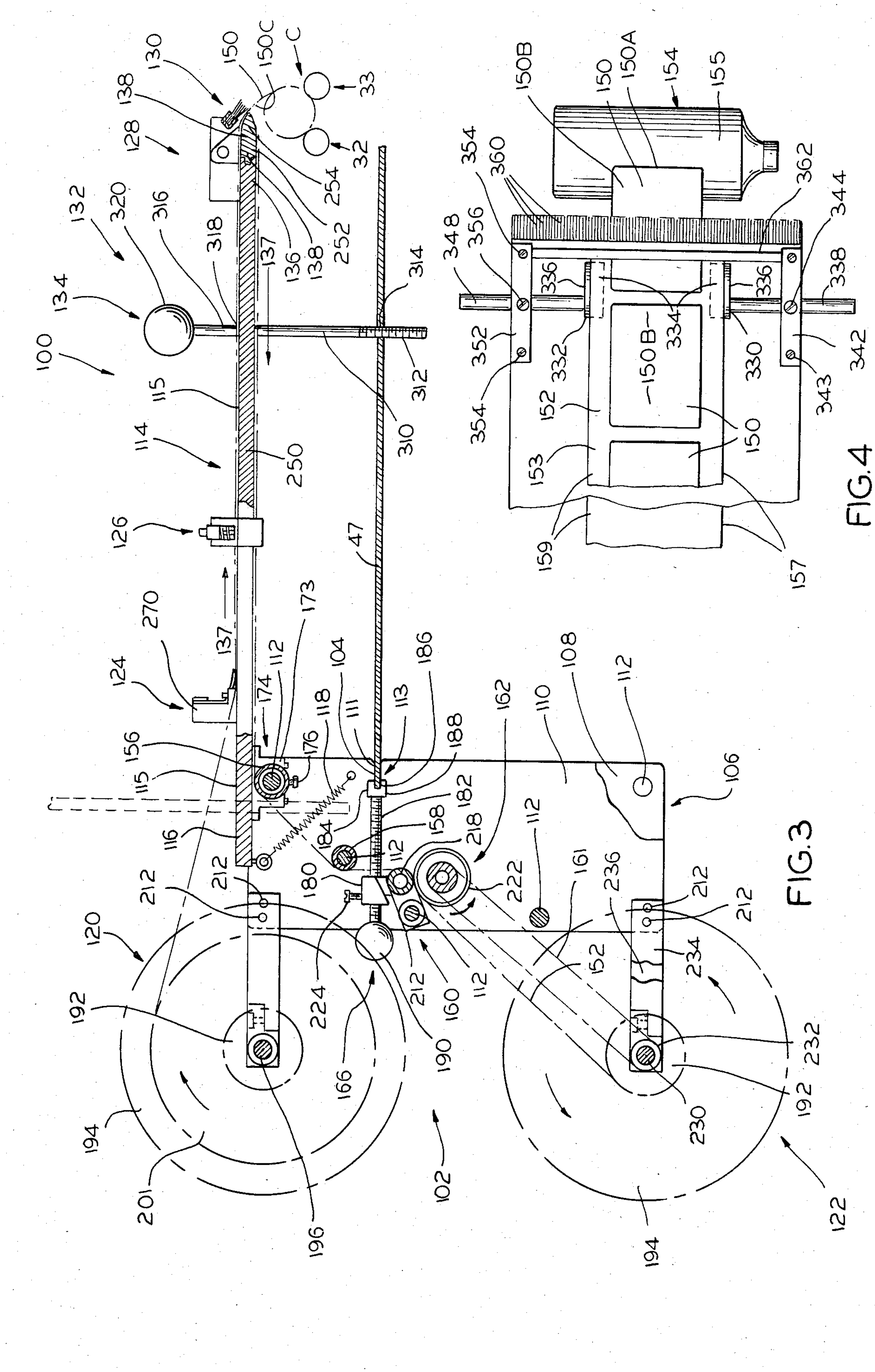
Figure 5:
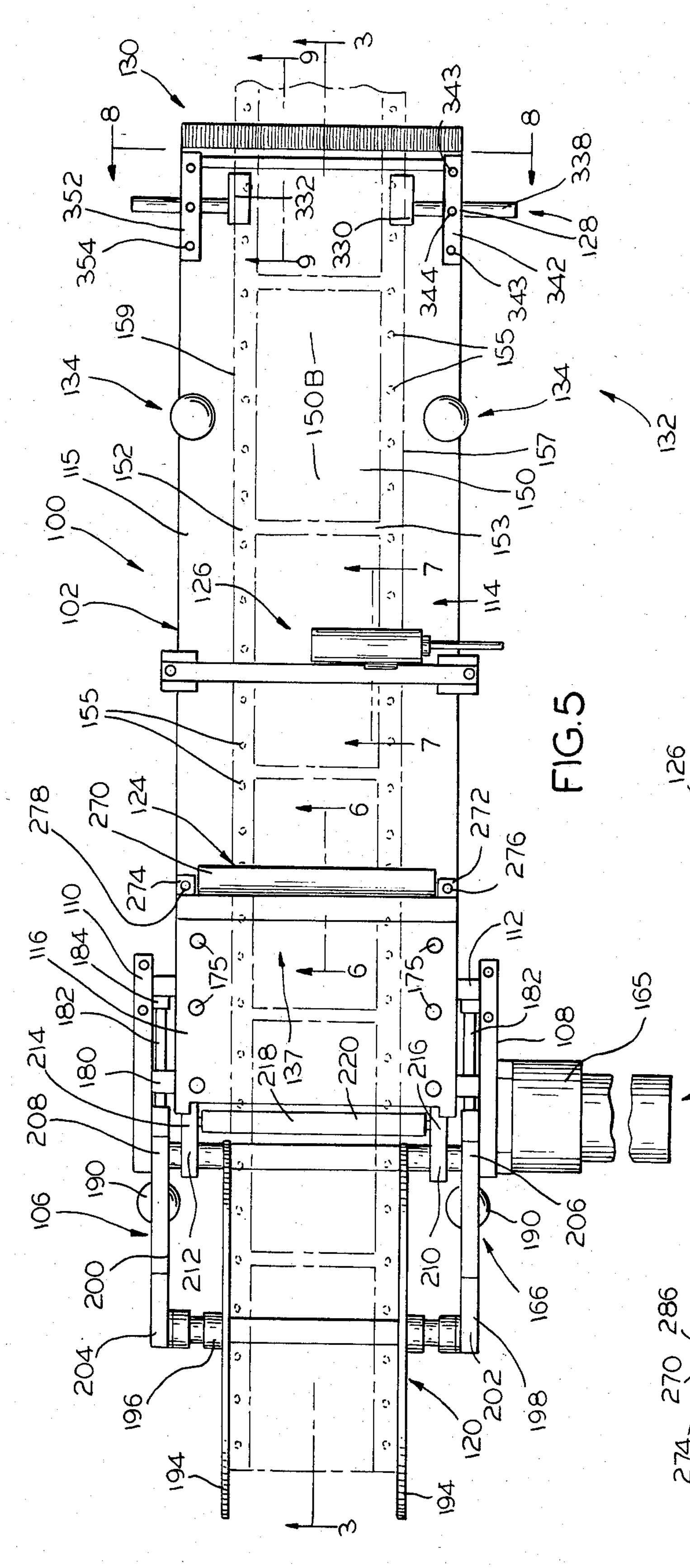
Figure 8:
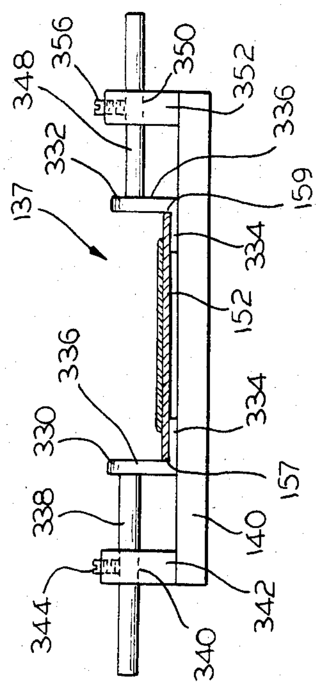
Figure 7:
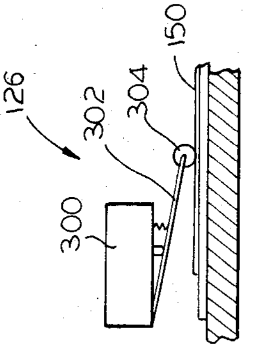
Figure 6:
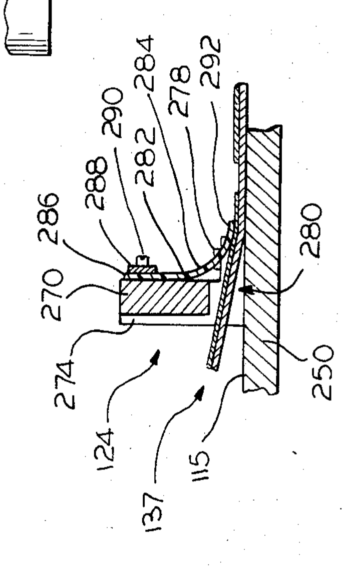

FIG. 3 is a vertical sectional view through the pressure sensitive label processing or handling attachment as operably mounted on the hopper floor plate of the basic glue labeling machine, taken substantially along line 3—3 of FIG. 5 showing in broken lines the pressure sensitive label bearing ribbon and indicating the manner in which it is trained from the supply spool across the top of the feed table and about its label adhesion breaker edging, and return under the table through the ribbon tensioning and drive mechanism and thence to the take up spool;

FIG. 4 is a fragmental enlarged plan view of the label breaking end of the attachment feed table and associated parts, with a label bearing ribbon shown as trained in accordance with the invention and a container in the process of being labeled in accordance with the invention;

FIG. 5 is a plan view of the attachment on an enlarged scale, with parts broken away, and showing the pressure sensitive label bearing ribbon in broken lines as applied to its training way;

FIG. 6 is a fragmental cross-sectional view taken substantially along line 6—6 of FIG. 5;

FIG. 7 is a fragmental diagrammatic cross-sectional view taken substantially along line 7—7 of FIG. 5;

FIG. 8 is a fragmental sectional view taken substantially along line 8—8 of FIG. 5; and FIG. 9 is a diagrammatic fragmental sectional view taken substantially along line 9—9 of FIG. 5.

However, it is to be distinctly understood that the specific drawing illustrations provided are supplied primarily to comply with the requirements of the Patent Laws, and that the arrangement involved is susceptible of modifications and variations by those skilled in the art which are intended to be covered by the appended claims.

GENERAL DESCRIPTION

Figure 1:
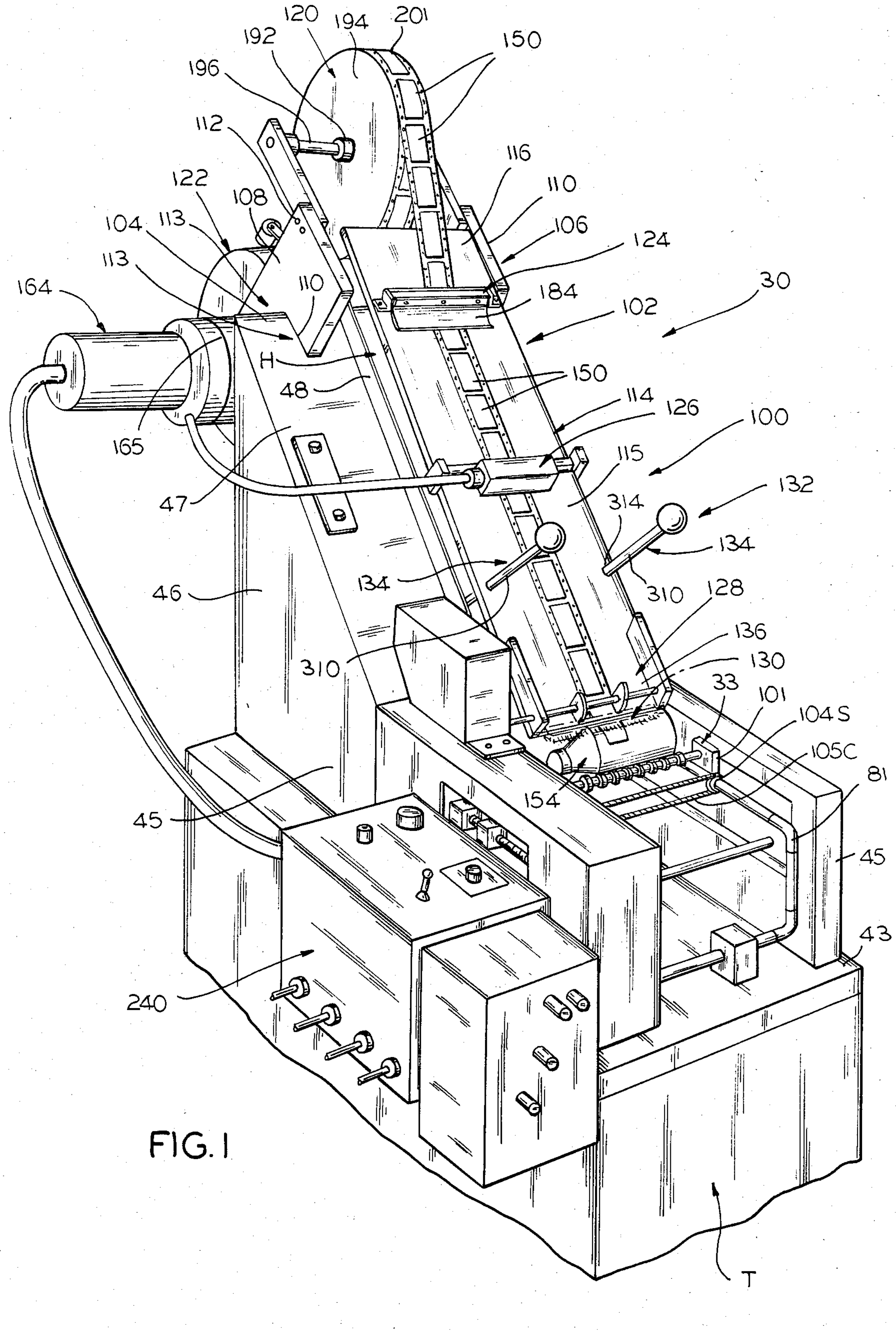
FIG. 1 is a diagrammatic perspective view diagrammatically illustrating a commercial embodiment of the basic glue labeling machine of said Wesley patent, equipped with the pressure sensitive labeling attachment of this invention, showing a container in the course of being labeled by the practice of the present invention.

Referring first to FIGS. 1 and 2, which illustrate a number of the basic components of the basic glue labeling machine of said Wesley patent (the disclosure of which is hereby incorporated herein by this reference), it will be seen that the labeling machine 30 generally comprises an inclined adjustable hopper H in which a supply of adhesive free labels L are supported for separating and feeding one by one past a glue station G, and after glue has been applied to the individual labels L being processed, the label L is guided into cooperation with a container that is to be disposed at the labeling station A and rotated for application of the label L thereto. In accordance with the disclosure of said patent, round containers are applied to a pair of constantly driven support rollers 32 and 33 which form a support cradle 35 or crib for the container being labeled, with the roller 32 being located on a fixed axis adjacent to and above the output side of glue station G, while the other support roller 33 is mounted for adjustment toward and away from the roller 32 so that containers of different diameters may be supported in the desired support relation by the two rollers 32 and 33.

As described in said patent, the labels L are fed one at a time from hopper H to register station R that is defined in part by a retractable register stop 35; when the leading edge of the label L is engaged with the stop 35, such leading edge is located between a pair of constantly driven normally separated feed rollers 36 and 37 so that upon withdrawal of the stop 35 and on engagement therewith of the two feed rollers 36 and 37, the label L that has been advanced to the register station R is withdrawn from hopper H and advanced to and through the glue applying station G for application to the container.

Hopper H is provided with a sloping bottom or floor plate 47 that slopes downwardly and has a pair of adjustable side guides 48 that together with the floor or bottom plate 47 define the hopper H in which the stack of labels L is positioned. Feed roller 36 and register stop 35 project through an opening 47B in the plate 47, and the plate 47 extends beyond or to the right of the opposed feed rollers 36 and 37 (as viewed in FIG. 3) to a point just above the left hand side of the relatively large glue coating roller 60 that forms a part of glue coater 61 that is located just beneath and somewhat to the left of the support roller 32 (as shown in FIG. 3). As a label L is advanced by the feed rollers 36 and 37 from the register position, such label L moves along the plate 47 and beneath the guiding and feeding roller 62 and thence into engagement with the coating roller 60 that is constantly rotating, from which it moves into label applying position from beneath the support roller 32, where the leading edge of the label L strikes a series of spaced guide plates 65 that direct the leading edge of the label L outwardly from between the guide plates 65 and the support roller 32 into a label outfeed position where the label L is intended to engage the external wall surfacing of the container that is supported by the support rollers 32 and 33 which are constantly rotating while such containers of like size are being processed semi-automatically in accordance with said patent.

Other related parts of the machine of the said Wesley patent are shown in FIGS. 1 and 2 with identical reference numerals being applied thereto, it being understood that reference may be had to said Wesley patent for complete description of the component parts involved and their operation.

In accordance with the present invention, the pressure sensitive label processing mechanism or device 100 is provided that is arranged in the nature of an attachment 102 for application to the machine 30, and specifically the upper end 104 of the hopper floor plate 47.

The mechanism or device 100 comprises frame 106 comprising a pair of spaced apart plates 108 and 110 joined together by suitable cross connectors 112 that dispose the plates in spaced apart parallel relation, with the upper cross connector 112 pivotally mounting between plates 108 and 110, cantilever fashion, feed plate 114 that is suitably journalled on the upper cross connector 112 adjacent the feed plate end 116 for pivotal movement about a horizontal axis that is perpendicular to the planes of the plates 108 and 110 whereby the feed plate 114 is pivotally mounted for movement in a vertical plane between the full line extended or operating position of FIGS. 1–3 and the broken line retracted position of FIG. 3, with the feed plate 114 being biased toward the latter position, as by employing, for instance one or more tension springs 118 connected between the respective plates 108 and 110 and the feed plate 114 in the manner suggested in FIG. 3.

Frame plates 108 and 110 are similarly slotted as at 111 transversely thereof to define the frame slotting 113 in which the upper end 104 of hopper floor plate 47 is received to mount device 100 on machine 30.

The frame 106 is arranged to removably and rotatably mount the pressure sensitive label supply spool 120 and take up spool 122. Operably associated with the feed plate 114 is preprocessing wiper assembly 124 (see FIG. 6), feeler switch assembly 126 (see FIG. 7), the pressure sensitive label carrier ribbon side guide assembly 128 (see FIG. 8), and wiper brush guide assembly 130 (see FIGS. 5 and 9). The feed table 114 is equipped with a pair 132 of hold down handles 134 that in the operating position of the feed table 114 are to have threaded engagement with the label hopper floor bottom plate 47 to hold same in the desired operating position relative to a container to be labeled that has been applied to labeling station A.

The feed table 114 at its projecting end 136 is equipped with a transversely extending wedge type edge forming member 138 defining a flat angled edging 140 (see FIG. 9), which while not being knife edge sharp in configuration, is of rounded flat angle wedge type configuration for defining a reversing slide or cam surfacing 142 at the edging 140 which serves a significant pressure sensitive label adhesion breaking action in accordance with the present invention.

The device or mechanism 100 is arranged to handle pressure sensitive labels of any suitable type, such as those indicated by reference numeral 150, which are intended to illustrate or represent the various common commercially available forms of pressure sensitive labels in bulk form, in which the individual labels 150 are adhered, in equally spaced relation, to and lengthwise of a suitable carrier ribbon 152 bearing a suitable release agent coating 153 to which the pressure sensitive adhesive of the respective labels 150 releasably adheres, for ready separation therefrom for removal from the ribbon and application to the suitable substrate surface, such as the external surfacing 155 of the side wall of a container 154 applied to the support rollers 32 and 33 for labeling purposes. Labels 150 are commonly formed from vinyl sheeting having its back side coated with a suitable pressure sensitive adhesive coating that may be one of a number of types known to those skilled in this art, some of which are described in Heuser U.S. Pat. No. 3,315,387. The ribbon 152 may take the form of strip of paper based or polymeric film having as its release coating 153 a suitable silicone or silicone rubber of one of the types commonly known to this art; in this connection see the disclosure of said Heuser patent for further background on this subject.

The ribbon 152 bearing the labels 150 is trained across the feed plate 114 in a training way 137 that underlies the preprocessing wiper device 124, and the feeler switch mechanism 126 and passes through the label ribbon side guide assembly 128 and about edging 140 in substantially reversing angular relationship to the feed plate, and back under the feed plate 140, over sleeve type roller 156, guide roller 158, ribbon tensioning device 160 and onto take up spool 122 which is driven through suitable O ring type pulley band 161 by suitable drive roller assembly 162 motivated by a suitable motor 164 through suitable gear reducer 165.

Adjustment device 166 (see FIG. 3) is provided in association with the frame 106 to adjust the feed table 114 for movement longitudinally and cantwise of the floor 47 with regard to the support rollers 32 and 33.

In use, the machine 30 is adapted for application thereto of the attachment mechanism 100 of this invention by removing any labels L from the machine hopper H that would interfere with the application of frame 106 thereto. Frame 106 is conveniently mounted in place by applying the frame slotting 113 onto the end 104 of the hopper floor plate 47 to rest the frame 106 on plate 47 in the manner indicated in FIG. 1.

With the frame 106 mounted on the upper end of the hopper floor plate 47, a spool 120 has applied to same a ribbon 152 bearing labels 150 on its release agent coated surface 153; the labels 150 and ribbon 152 are intended to diagrammatically represent any commercially available pressure sensitive label and carrier ribbon, some forms of which are provided with indexing apertures 155 for mechanical feeding purposes that form no part of the present invention. The spool 120 as so equipped, and an empty wind up spool 122, are journaled on frame 106 and the leading end of the ribbon 152 is threaded through and about the training way 137 to bring the ribbon 152 under the wiping device 124 and the feeler switch device 126, through the side guide assembly 128, about edging 140 and cam surfacing 142, in the reverse angulation indicated in FIGS. 3 and 9, thence back under the feed table and across guide rollers 156 and 158, between tensioning device 160 and drive roller 162, and thence to the take up reel 122 where the leading end of the ribbon is suitably affixed thereto in any conventional manner, which, of course, may be in a manner similar to the way the leading end of a moving picture film is anchored to its take up reel. While the leading segment of the ribbon 152 that extends between the edging 140 and the take up reel 122 may bear a number of the labels 150 that are wasted, it is to be understood that the ribbon 152 bearing the labels 150 is many feet long in length to provide a considerable number of the labels 150 of the same size and spacing for application to the desired number of containers 154, which may run in the hundreds or more for a particular run of the machine 30.

The adjustment devices 132 and 166 are then operated to position the feed table 114, and specifically its edging 140 and cam surfacing 142 adjacent to and aligned with one of the containers 154 to be labeled that is positioned by hand at the labeling station in the manner indicated and as described in said Wesley patent.

For purposes of the present invention, the machine mechanisms for feeding the labels L to the labeling station A and the mechanisms for operating the glue coater may be arranged to be shut off when the attachment 100 is operating, but the switching is arranged to provide for continuous rotation of the rollers 32 and 33 during the pressure sensitive labeling operation, with, of course, the roller 33 being positioned relative to the roller 32 in the manner described in said patent to appropriately support the container 154 to be labeled, depending on the size of the specific container 154 involved in the run of such containers to be labeled.

Further, the feeler switch 126 and a switch comparable to switch S-1 of said Wesley patent should be operationally related so that when the container 154 is on the rollers 32 and 33, its engagement with the roller 110A of swing arm 111A effects closing of the switch S-1 to energize the drive motor 164 to advance ribbon 152 forwardly the length of one label 50, with a forward movement of the ribbon 152 then being stopped by arranging for the feeler switch assembly 126 to shut off the roller 164 when its feeler mechanism (see FIG. 7) drops between an adjacent pair of labels 150.

As the ribbon 152 advances, the leading end 150A of the leading label 150 (see FIG. 9) breaks away from the ribbon 152, and specifically the release agent coated side 153 of same, due to the sharp angulation of the return of the ribbon 152 about the edging 140, with continued movement of the ribbon 152 in its forward direction along the training way 137 in effect peeling the leading label 150 from the ribbon. As the leading end 150A of the leading label 150 moves away from the edging 140 and ribbon 152, the wiping brush device 130 wipingly guides the upwardly facing surface 150B of the label to direct the leading end 150A of the label toward the external side surfacing 155 of the container 154 so that the adhesive coating of the leading label underside 150C will adhere to same at the label leading end 150A, with the result that the leading end of the label 150A adheres to the rotating container 154, and the rotating container 154 operates to wind up the leading label 150 thereon as such label completes its separation from the ribbon 152. Of course, the speeds of rotation of the rollers 32 and 33, the container 154, and the speed of forward movement of the ribbon 152 are properly coordinated in terms of linear speed (the liner speed of the container surfacing 155 and the ribbon 152 should be the same) to effect smooth application of the indicated label 150 to the container 154. When the label 150 in question is applied to the container 154, the now labeled container 154 is removed from the support rollers 32 and 33 by hand and replaced by a second container 154 of the same size to be labeled, and the sequence of operation of the mechanism or device 100 repeats in the same manner. Thus, all containers 154 of the same size for the labeling run in question may be labeled to the extent of labels available on the ribbon 152, which, of course, may, be supplemented by replacement rolls of ribbon 152 bearing the indicated labels 150 being applied to reel 120, and processed as hereinbefore described, as needed to complete the labeling run in question. When different size containers 154 are to be labeled with the same size labels, the adjustment devices 132 and 166 are manipulated to properly set the feed table 114 with respect to the different sized container 154, following the positional relationships of the components involved that are indicated in the drawings, and adjustable roller 33 is set as needed to handle the variant sized container 154 (in the manner specified in said Wesley patent).

SPECIFIC DESCRIPTION

While reference may be had to said Wesley Pat. No. 3,278,359 for the specifics of the basic machine 30, some component parts are illustrated and referred to herein to insure the needed understanding of the present invention and the technical background in which it operates.

The basic labeling machine 30 has a relatively rigid supporting base or table T that suitably mounts the drive motor and speed reducer of the basic machine, as suggested in said patent, and the table T has a top 43 upon which the main portions of the basic machine 30 are mounted included the spaced side frame members 45 and their upstanding support plates 46 that serve as a mounting means for the hopper H and for other elements of the machine, as disclosed in said patent. The hopper H, of course, includes a sloping bottom or floor plate 47 that has already been referred to. The means for separating the labels L of hopper H is of the top feed type, as indicated in FIG. 3, and has an adjustable but normally stationary rubber retard roller 49 mounted on an adjustable axis at an opening 47A of plate 47. Above the retard roller 49 and on an axis parallel thereto are one or more separating rollers 50 that are fixed on a freely adjustable supporting shaft 51 (which is supported and driven in the manner shown and described in said patent), which includes suitable gearing actuated by swing arm 54, as shown in said patent, being movable to shift a rubber roll into engagement with a constantly driven knurlled roll fixed to the shaft 37S (which has feed rolls 37 fixed thereto for rotation thereby), this being done by the operation of a solenoid SOL-1 (not shown in the drawings of the present application) provided for this purpose as disclosed in said patent.

While the mechanisms of said basic machine for separating the label L from a stack of labels L in the hopper H and advancing same across the glue coater 61 are not required for the practice of the instant invention, these components are preferably left in place and arranged consistent with the operation of the device or mechanism 100 so that the device or mechanism 100 may be applied to the machine 30 and become a part of same without having to remove the basic machine components shown in FIGS. 1 and 2.

In this connection, the basic machine 30 includes the tubular support frame 81 that is mounted on the table 43 between the side frames 45. As has been indicated, the rollers 32 and 33 continuously rotate when the main control switch of the machine 30 is closed, and the roller 32 operates on a fixed horizontal axis that parallels that of adjustable roller 32, with the rollers 32 and 33 defining a cradle or bed C for the container to be labeled that is crosswise of the direction of feed or application of the labels to the container, regardless of whether the basic machine 30 is being employed for glue labeling purposes, or the label handling mechanism or device 100. To provide for the adjustment of the roller 33, it is supported on bearings 101 (see FIG. 2) at its opposite ends and these bearings 101 have downwardly projecting portions 101P within which rotatable nuts 102N are provided. The nuts 102N are mounted respectively on a pair of horizontal screw shafts 103S that form part of the frame 81 and are supported in a horizontal plane and are held against rotation. When adjustment of the support roller 33 is desired, the nuts 102N are rotated in unison to move the opposite ends of the roll 33 toward and away from the roll 32. As disclosed in said patent, the two nuts 102N are rotated in unison by means including sprockets 104S fixed to the nuts 102N and connected together by an endless chain 105C.

Referring now more specifically to FIGS. 3-9 and the pressure sensitive label handling device or mechanism 100, the frame 106 of the attachment 102 is in the form of the indicated plates 108 and 110 that are suitably fixed together in spaced apart parallel and congruent form, with the plates 108 and 110 being each similarly slotted as indicated at 111 in FIGS. 1 and 3 to define the slotting 113 of frame 106 that receives the upper end 104 of hopper floor bottom plate 47. The connectors 112 in the form shown are of rod or bar configuration and are suitably fixed to the respective plates 108 and 110, as by employing suitable screw connectors from outside the respective plates 108 and 110 applied to the ends of the respective bars or rod 112 (not shown). The feed table 114 is journaled, in the form shown, on the uppermost bar 112 by a pair of suitable pillow block type bearing units 174, in spaced apart relation, which units 174 may be one of the SEALMASTER pillow block bearing units offered commercially by Borg Warner Corporation. The units 174 in the form shown are secured to the underside of feed table 114 by suitable screw connector devices 175, and each unit 174 has its housing 177 equipped with set screw 176 that may be turned into engagement with the rod 112 to hold fast the feed table 114 when it is in its retracted upwardly angle relation that is indicated in FIG. 3. Of course, the set screws 176 are loosened to permit the feed table 114 to be disposed in its illustrated operating position.

The adjustment device 166 comprises a stub bar 180 for each plate 108 and 110, fixed respectively thereto within frame 106 and aligned with each other, longitudinally thereof. The stub bars 180 are aligned disposed (see FIG. 3) in fixed alignment with the respective slots 110 of the respective plates they are attached to, with the bars 180 each threadedly mounting a threaded shank 182 (see FIG. 5) each equipped with a head 184 rotatably mounted on same and formed to define slot 186 in which the upper end edge 188 of the floor sheet 47 is to be received or seated when the frame 106 is applied to the sheet 47. The threaded shanks 182 are each equipped with a handle forming knob 190 for individually turning the shanks 182 to adjust the position of the heads 184 relative to the respective stub bars 180, and thus the position of the feed table edging 140 relative to the containers to be labeled; since the threaded shanks 182 may be turned independently of each other, it will be observed that in addition to the feed table edging 140 being moved toward and away from the locale of the labeling station A, the edging 140 may also be adjusted cantwise thereof to be brought into parallelism with the axis of the rotating container C. Thus, the edging 140 may be swung from side to side of the feed table as may be needed to set the edging 140 at the preferred operating relation to the container being labeled. Stub bars 180 are secured in place as by employing fastening screws or the like.

The spool 120 may be of any suitable type, that illustrated comprising drum 192 that is flanged as at 194 on either side of same for holding the convoluted label bearing tape 152 on reel 120, with the drum being journaled on suitable shaft 196 mounted between a pair of support arms 198 and 200, as at their respective ends 202 and 204, the other ends 206 and 208 of which are suitably secured to the respective frame side plates 108 and 110, as by employing suitable screws 212 for that purpose; to apply the spool 120 one of the supports 198 or 200 is removed so that the shaft 196 may be applied to the spool and then reapplied to the respective ends 202 and 204 of the support arms 198 and 200, after which the removed support arm is reattached to the frame 106. As will be apparent, one of the spool flanges 194 is removably mounted for applying a convoluted or rolled up roll 201 of ribbon 152, having labels 150 adhered thereto in the manner indicated.

The rollers 156 and 158 may be in the form of sleeves rotatably applied to the respective cross members 112 they are mounted on. The ribbon 152 in being trained over rollers 156 and 158 is passed between bearings 174.

The tensioning device 160 comprises a pair of swing arms 210 and 212 (see FIG. 5) journalled on the cross bar 112 that is adjacent the stub bars 180, with the swing arms 210 and 212 being pivotally mounted cantilever fashion and at their projecting ends 214 and 216 journaling suitable tensioning roller 218 (see FIG. 3) which preferably has an elastomeric surfacing 220. Drive roller 162 is suitably journalled between plates 108 and 110, and preferably has an elastomeric surfacing 222 against which ribbon 152 is biased by the hold down device 160, which also includes suitable screws 224 threadedly mounted in the respective stub bars 180 and aligned with the respective swing arms 210 and 212 for being turned thereagainst to press the hold down roller 218 in the direction of drive roller 162 and thereby effectively grip the ribbon 152 for movement advancement purposes.

The reel 122 may be the same as reel 120, and thus comprises a suitable drum 192 that is flanged as at 194 on either side of same to hold the ribbon 152 on the reel 122 as the ribbon 152 is wound up on the reel 122. Reel 122 is mounted on suitable shaft 230 that is in turn mounted between the outwardly projecting ends 232 of a pair of support arms 234 and 236 that are secured to the respective frame plates 108 and 110, as by applying the aforeindicated suitable screws 212. Thus, wind up reel 122 may be applied to and removed from the frame well section in the same manner as supply reel 120, and includes one of its flanges 194 being suitably removably mounted on same for removing the roll of ribbon 152 that is convoluted or wound up on same.

Supply reel 122 is preferably rotated in its wind up direction by employing a suitable O ring type drive band 161 suitably applied between the shaft 230 and drive roller 162.

The drive motor 164 is suitably connected to the frame plate 108 in any convenient manner and is energized from control mechanism 240 in any convenient manner, in association with the other basic controls of the machine 30 and the feeler switch device 126.

The feed table 114 comprises elongate, relatively narrow, and relatively thin base plate 250 that is generally of quadrilateral, elongated rectangular configuration in plan, and at the end 136 of the feed plate, is suitably fixedly mounted edge forming member 138 in the form of breaker bar 252 that extends transversely of the plate 250 and is shaped at its projecting end 254 to define the edging 140 and the related cam surfacing 142, which, as indicated in FIG. 9, involves an upper angled surfacing 256 and a lower angled surfacing 258 that are disposed at a flat angulation with respect to each other on the order of 15 degrees, but which actually merge in a rounded corner 260 that, together with the surfaces 256 and 258, define the edging 140 and the cam surfacing 142. It is found that an angulation of this type, without a sharp edging, as such, at the corner 260, reverses the shaping of the ribbon 152 as needed in accordance with the invention to break the leading edge 150A of the label 150 from its carrying ribbon 152 for application to the container 154 in accordance with the invention.

The breaker bar 252 may be affixed to plate 250 in any suitable manner, as by employing a suitable bonding material (not shown) at the tongue and groove connection 264 therebetween.

The ribbon wiping device 124 (see FIG. 6) comprises a support bar 270 suitably fixed, as by employing suitable screws (not shown), between a pair of angle members 272 and 274 suitably secured to plate 250 as by employing appropriate screws 276 and 278, so as to dispose mounting bar 270 crosswise of the feed table 114. Mounting bar 270 is formed to define with plate 250 and thus feed table 114, a window or slot 280 extending transversely of the feed table 114 through which the label bearing ribbon 152 extends in being disposed in its training way 137. Extending across the forward side 282 of the mounting plate 270 is resiliently flexible wiper member 284 that has its upper end 286 suitably affixed to the mounting bar 270, as by employing clamping plate 288 secured in place by suitable screws 290, while the lower end 292 of the wiper member 284 is pressed downwardly against table 114 to arc downwardly and forwardly to wipingly engage the top surfacing 153 of the ribbon and the individual labels on same that are disposed in training way 137. The wiper member 284 may be formed from any suitable relatively stiff resiliently flexible plastic material, such as a suitable polyethylene film of appropriate thickness, and its arcing out of its normal planar shape results in the biasing the ribbon 152 and the labels 150 it bears on, against the top surfacing 115 of feed table 114, to insure that each label 150 is uniformly adhered to its carrier ribbon 152, whereby uniform breaking away and feeding of the individual labels 150 from the ribbon 152 during the labeling procedure is assured.

The nature of the feeler switch device 126 is diagrammatically illustrated in FIG. 7, from which it will be seen that any suitable feeler switch of this type may be employed in the manner suggested for providing the step by step intermittant starting and stopping of the movement of the ribbon 152 and the labels it bears as containers are applied to and removed from the support rollers 32 and 33. As illustrated in FIG. 7, a suitable switch mechanism 300 is provided (shown in block diagram form only), the operation of which may be diagrammatically illustrated by way of the downwardly biased feeler arm 302 having a roller 304 or its equivalent which rides on the top surfacing of the ribbon 152 and the labels 150 it carries whereby when the switch mechanism feeler roller 304 rides on the labels 150 the switching device is normally open, but in the interval between adjacent labels 150, the switching mechanism involved changes to the closed position to set up the apparatus involved for the next container to be labeled.

Alternately, an appropriate photoelectric unit may be employed as the sensing device 126.

The adjustment device 132 comprises a pair of hold down handles 134 each comprising in the form illustrated a stepped diameter spindle 310 (see FIG. 3) having its end portion 312 externally threaded for cooperation with the respective internally threaded apertures 314 formed in the hopper floor sheet 47. The portion 316 of the respective spindles 310 that is of larger diameter defines an annular shoulder 318 that sits against the top surfacing 115 of the feed table.

The respective spindles 310 have suitably fixedly applied to same ball type handles 320 for threading the respective spindles 310 into the respective apertures 314 so as to position breaker bar 252 as desired relative to the container 154 being labeled in accordance with the principles of this invention.

The ribbon side guide device 128 (see FIGS. 3, 5 and 8) comprises a pair of oppositely disposed angle members 332 each comprising a lower or under flange portion 334 that are disposed in coplanar relation and parallel the plane of the table 114, and upstanding side wall portions 336 against which the ribbon respective side edges 157 and 159 ride in centered relation between the angle members 330 and 332. The upstanding wall 336 of member 330 is affixed to support spindle 338 that extends through suitable aperture 340 formed in mounting block 342 that is suitably affixed to the table 114, as by employing suitable securement screws 343. Set screw 344 of any suitable type is employed to fix the spindle 338 in a desired position of adjustment. Similarly, angle member 332 has its upwardly directed flange 336 suitably affixed to spindle 348 that extends through suitable aperture 350 formed in mounting block 352 that is suitably affixed to feed table 114 as by employing appropriate screws 354. Set screw 356 is applied to the mounting block 352 to fix the spindle 348 in the desired position of adjustment. The positions of adjustment for the respective side guide angle members 330 and 332 will depend on the width of the label bearing ribbon being processed for a particular container labeling run, but ordinarily it is preferable to dispose the members 330 and 332 with respect to each other so that the ribbon 152 will be centered across the mid portion of the feed table 114.

The brush device 130 comprises several rows of brush bristles 360 secured together in a suitable casing 362 to define a flap type brush bristle wiper member 364 that is disposed in spaced relation to the breaker bar 252, and in particular, to its upper angled surfacing 256 which it substantially parallels, with the casing 362 being suitably affixed between the mounting blocks 342 and 352, as by bonding the casing 362 in place in the respective indentations 370 and 372 (see FIGS. 2 and 9) formed in the respective mounting blocks 342 and 352 for that purpose. The bristle type flap member 364 is resiliently flexible and its angulation relative to the breaker bar 252 and the latter's edging 140 disposes the flap 364 to serve a resiliently biasing wiping function on the individual labels 150 as they break away from the ribbon 152 and progressively peel from of ribbon 152 for directing same for engagement with and adherence to the container 154 to be labeled that is rotating below same, as illustrated in FIG. 9.

It will therefore be seen that the invention provides an attachment for the basic labeling machine of said Wesley patent in the form of a pressure sensitive label handling mechanism or device 100 that adapts such basic machine for application to round containers of pressure sensitive adhesive backed labels. Such labels cannot be handled in the same manner as is involved in glue coating labeling, and pressure sensitive labels conventional are supplied in bulk adhered to the indicated type ribbon carrier to protect the adhesive and provide a convenient way of handling such labels in multiples of large or small numbers; the carrier conventionally bears a release agent coating on the label bearing side of same for this purpose to permit ready removal of the labels from the carrier. These label bearing ribbons may be obtained from numerous sources commercially to provide the number of labels per roll of ribbon as desired. Following the teachings of said Wesley patent, the machine 30 may be set up to handle a particular sized container for multi unit labeling purposes by employing the adjustment and setting procedures suggested in said patent. For each run of containers to be labeled employing the device or mechanism 100, the breaker bar 352 and associated parts are to be associated with the container to be labeled in the manner indicated in FIGS. 3, 5, and 9, for the respective container sizes that may be involved.

The combined machine that includes the attachment mechanism or device 100 may be operated to either provide glue labeling or pressure sensitive labeling, or both at the same time by appropriate adjustment and setting of the components involved. The pressure sensitive label handling mechanism or device 100 permits containers 154 to be labeled at speeds of twenty units per minute or more, depending on the manual dexterity of the operator.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a semi-automatic labeling machine for applying discrete labels to each container of a run of round containers each of which is of the same predetermined size, with the machine including a label supply hopper having a downwardly sloping floor plate, a glue applying station, a labeling station including a pair of support rollers disposed normally of the path of movement of the individual labels from the supply hopper therefor through the stations, upon which a round container of the container run to be labeled may be manually applied on the side thereof to be supported and rotated about its longitudinal axis by said support rollers, with one of the support rollers being mounted for adjustment movement toward and away from the other support roller to accommodate labeling containers of container runs made up of containers of all the same but variant container run sizes, and means for individually feeding said discrete labels from the hopper through the glue applying station along the path of movement for application of glue thereto and then to label applying relation at the labeling station, and after consecutive of the labels are applied to consecutive of the run containers, the labeled container is manually removed from the support rollers to be manually replaced by the next run container to be labeled, an attachment therefor for adapting said machine to consecutively apply discrete pressure sensitive adhesive backed labels to each container of a run of round containers each of which is of the same predetermined size and each of which is consecutively manually applied to the support rollers and manually removed therefrom when labeled, with the pressure sensitive labels to be so applied to the containers of such run being each of the same predetermined size and consecutively adhered in equally spaced relation to a release agent coated side of a web in ribbon form, said attachment comprising:

an elongate feed table, a mounting frame for removably and adjustably mounting said feed table on the upper end of the machine hopper floor plate, said feed table adjacent one end of same being adjustably mounted on said mounting frame cantilever fashion for adjustably disposing the other end of said feed table at the labeling station above the machine support rollers in label applying relation to a round container, of the run of such containers, that has been manually applied to and supported on the machine rollers for pressure sensitive label labeling thereof, means for mounting the ribbon bearing the pressure sensitive labels on said feed table for forward movement longitudinally of and across the upper surface of said feed table in the direction of said other end thereof, with the pressure sensitive labels of the ribbon adhered to the ribbon facing upwardly, said feed table at said other end thereof terminating in a flat angle wedge type edging extending traversely thereof, means for adjusting said mounting frame relative to the machine hopper floor plate for disposing said feed table edging into parallelism with the axis of rotation of a round container, of the run of such containers, when supported on the machine rollers at the labeling station and rotated thereby, means for defining a training way for the ribbon bearing the pressure sensitive labels for forward movement of the ribbon about said edging and reversely under said table, means for intermittently feeding the ribbon longitudinally thereof in said forward direction when a round container, of the run of such containers, is manually applied to and is rotated by the support rollers, whereby the ribbon labels are individually and consecutively separated from the ribbon as the ribbon is passed over and about said edging, means for taking up the ribbon after it passes said edging, and means mounted at said feed table other end adjacent said edging for directing the individual labels onto the run container being labeled as such label is separated from the ribbon.

2. The attachment set forth in claim 1, wherein:

said directing means comprises a wiper member extending transversely of said feed table and spaced from said edging to be disposed in wiping relation with the upwardly facing side of the respective labels of the ribbon as such labels are consecutively and progressively peeled from adherence to the ribbon to direct the label being so separated from the ribbon onto the run container to be labeled by such label.

3. The attachment set forth in claim 1 wherein:

said feed table rearwardly of said edging and on the upper surface of same includes a resilient wiping lip extending transversely across said feed table and arcing downward against said feed table upper surface and directed forwardly of the direction of movement of the ribbon therealong for wiping the individual labels against the ribbon as the ribbon is moved in said forward direction across said upper surface of said feed table, whereby the labels on the ribbon are consecutively wiped against the ribbon by said lip in advance of said edging to provide for uniform breaking away and peeling of each such label when the ribbon is moved in said forward direction about said edging.

4. The attachment set forth in claim 3, wherein:

said intermittent feeding means comprises:

drive roller journalled in said mounting frame, means for frictionally coupling said ribbon to said drive roller, and feeler switch means carried by said feed table on said upper surface thereof, and including a feeler arm under which the ribbon passes when moved in said forward direction, whereby said feeler arm rides on the labels borne by the ribbon and on the ribbon release agent coated side when intermediate consecutive labels of the ribbon, and the ribbon is moved in said forward direction on said feed table, electric motor means for driving said mounting frame drive roller, said feeler arm being adjacent but spaced from said lip in said forward direction therefrom, said feeler switch including means actuated by said feeler arm to shut off said drive roller motor means when a label from the ribbon has been released therefrom and applied to the container, of the run of such containers to be labeled, that is supported on the machine support rollers, for accommodating manual replacement of such labeled container with a fresh container, of the run of such containers to be labeled, for labeling by actuating of said drive roller motor means and effecting application thereto of the next consecutive label of the ribbon.

5. The attachment set forth in claim 1 wherein the adjustable mounting of said feed table on said mounting frame comprises:

said feed table being mounted on said mounting frame for pivotal movement about a horizontal axis paralleling the plane of the machine hopper floor plate and extending crosswise of same, and including means for biasing said feed table for movement about said axis to swing said other end of same away from the machine support rollers in retracted relation of said attachment, and including adjustable hold down means cooperating between said feed table and the machine hopper floor plate for setting said other end of said feed table to dispose said label directing means in predetermined spacing above the machine support rollers.

6. The attachment set forth in claim 5 wherein said means for adjusting said mounting frame comprises:

means acting between said mounting frame and the machine hopper floor plate for adjusting said feed table longitudinally of the machine hopper floor plate for disposing said label directing means in predetermined operating position laterally of the machine support rollers.

7. The attachment set forth in claim 4 wherein said means for mounting the ribbon comprises:

means for rotatably mounting on said frame a spool on which the ribbon is convoluted for permitting said forward movement of the ribbon, and said means for taking up the ribbon comprising:

means for rotatably mounting a wind up spool on said frame including means for securing the leading end of the ribbon thereto, and means for rotating said wind up spool in coordination with the driving action of said drive roll for winding up the ribbon from which the labels have been removed.

8. Tha attachment set forth in claim 1 wherein said means for defining the ribbon training way adjacent said edging comprises:

a pair of opposed ribbon movement side guides positioned adjacent said edging on the upper surface of said feed table for engaging opposite side edges of the ribbon, and means for adjusting said ribbon side guides toward and away from each other for disposing same to guide the ribbon forward movement onto said edging in longitudinal centered relation relative to said feed table.

9. In a semi-automatic labeling machine for applying discrete labels to each container of a run of round containers each of which is of the same predetermined size, with the machine including a label supply hopper having a downwardly sloping floor plate, a glue applying station, a labeling station including a pair of support rollers disposed normally of the path of movement of the individual labels from the supply hopper therefor through the stations, upon which a round container of the container run to be labeled may be manually applied on the side thereof to be supported and rotated about its longitudinal axis by said support rollers, with one of the support rollers being mounted for adjustment movement toward and away from the other support roller to accommodate labeling containers of container runs made up of containers of all the same but variant container run sizes, and means for individually feeding said discrete labels from the hopper through the glue applying station along the path of movement for application of glue thereto and then to label applying relation at the labeling station, and after consecutive of the labels are applied to consecutive of the run containers, the labeled container is manually removed from the support rollers to be manually replaced by the next run container to be labeled, the method of labeling utilizing said machine to consecutively apply discrete pressure sensitive adhesive backed labels to each container of a run of round containers each of which is of the same predetermined size and each of which is consecutively manually applied to the support rollers and manually removed therefrom when labeled, with the pressure sensitive labels to be so applied to the containers of such run being each of the same predetermined size and consecutively adhered in equally spaced relation to a release agent coated side of a web in ribbon form, said method comprising:

establishing a feed path for the ribbon bearing the pressure sensitive labels over the machine hopper floor plate that includes a stationary flat angle reversing bend that is of rectilinear configuration transversely of the feed path, adjusting said feed path for the run of round containers that are to have the pressure sensitive labels consecutively applied thereto to dispose said feed path reversing bend at the labeling station elevationally above the machine support rollers in label applying relation to the position that a round container of such run of containers will have when manually placed on the machine support rollers, and in parallelism with the axis of rotation that such run container will be rotated about for label application thereto, intermittently moving the ribbon in a forward direction toward the reversing bend in timed sequence relation relative to rotation of the machine support rollers while wiping each label against the ribbon to insure full bonding of the label to the ribbon in advance of the feed path reverse bend, and for each run container of the containers of the run of containers that is to have one of the pressure sensitive labels of the ribbon applied thereto, manually placing the container on the support rollers and rotating the container thereby to establish its said axis of rotation at the labeling station, passing the ribbon in the forward direction along said feed path with the release agent coated side of same facing upwardly with the said one pressure sensitive label adhered thereto that is to be applied to the rotating container and the ribbon underlying same being centered with respect to said feed path while moving over, about, and thence reversely away from the feed path reversing bend to break such label from said ribbon side and progressively peel such label therefrom, and while such label is being peeled from the ribbon, directing the leading portion of the label onto the rotating container and winding such label up on the container as the container rotates, stopping rotation of the container and forward movement of the ribbon, and manually removing the labeled container from the machine support rollers.

10. The method set forth in claim 9 wherein:

the reversing bend has a reversing angle that approximates 165 degrees.

* * * * *